(12) United States Patent
Beard

(10) Patent No.: US 11,158,198 B1
(45) Date of Patent: Oct. 26, 2021

(54) MIXED-MODE LOCATION DETECTION AND ACCURACY AUGMENTATION FOR GNSS RECEIVERS

(71) Applicant: uAvionix Corporation, Palo Alto, CA (US)

(72) Inventor: Paul Beard, Bigfork, MT (US)

(73) Assignee: UAVIONIX CORPORATION, Bigfork, MT (US)

( * ) Notice: Subject to any disclaimer, the term of this patent is extended or adjusted under 35 U.S.C. 154(b) by 94 days.

(21) Appl. No.: 15/676,728

(22) Filed: Aug. 14, 2017

Related U.S. Application Data

(63) Continuation-in-part of application No. 15/494,230, filed on Apr. 21, 2017, now Pat. No. 10,244,364.

(60) Provisional application No. 62/374,260, filed on Aug. 12, 2016.

(51) Int. Cl.
| | |
|---|---|
| *H04W 24/00* | (2009.01) |
| *G08G 5/00* | (2006.01) |
| *G01S 19/14* | (2010.01) |
| *G01S 19/42* | (2010.01) |
| *B64C 39/02* | (2006.01) |
| *G01S 19/33* | (2010.01) |

(52) U.S. Cl.
CPC ......... *G08G 5/0069* (2013.01); *B64C 39/024* (2013.01); *G01S 19/14* (2013.01); *G01S 19/33* (2013.01); *G01S 19/428* (2013.01); *B64C 2201/122* (2013.01)

(58) Field of Classification Search
CPC ..... G08G 5/0069; B64C 39/024; G01S 19/14; G01S 19/33; G01S 19/428
See application file for complete search history.

(56) References Cited

U.S. PATENT DOCUMENTS

| | | | | |
|---|---|---|---|---|
| 2008/0191942 A1* | 8/2008 | Smith | ................... | G08G 5/0082 342/456 |
| 2011/0074626 A1* | 3/2011 | Alizadeh-Shabdiz | ....................... | G01S 19/48 342/357.31 |
| 2012/0262339 A1* | 10/2012 | Garcia | ................... | H04H 20/55 342/387 |

* cited by examiner

Primary Examiner — Justin Y Lee
(74) Attorney, Agent, or Firm — Suiter Swantz pc llo

(57) ABSTRACT

A mixed-mode positioning system and method for determining position data associated with a vehicle is disclosed, in accordance with one or more embodiments of the present disclosure. The system may include one or more receivers configured to receive Global Navigation Satellite system (GNSS) signals and one or more Automatic Dependent Surveillance Broadcast (ADS-B signals). The system may also include a processor configured to extract positional data from the one or more GNSS signals and one or more ADS-B signals. The processor may also be configured to determine ownship position data associated with a vehicle based on the extracted GNSS positional data and the extracted ADS-B positional data.

11 Claims, 5 Drawing Sheets

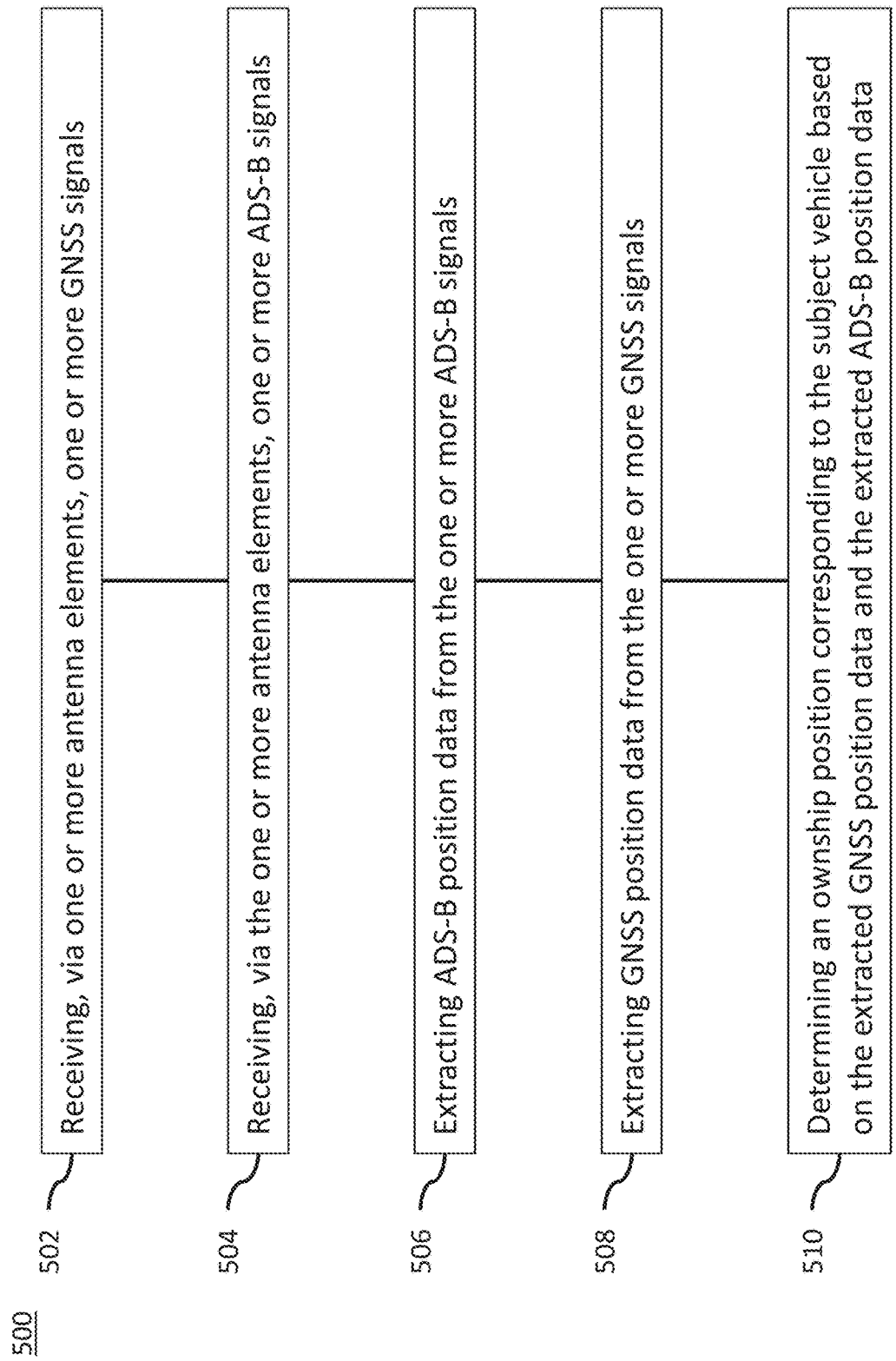

MIXED-MODE LOCATION DETECTION AND ACCURACY AUGMENTATION FOR GNSS RECEIVERS

CROSS-REFERENCE TO RELATED APPLICATIONS

The present application claims priority under 35 U.S.C. § 119(e) to provisional U.S. Patent Application Ser. No. 62/374,260 filed Aug. 12, 2016, entitled MIXED-MODE LOCATION DETECTION AND ACCURACY AUGMENTATION FOR GNSS RECEIVERS, which is incorporated by reference in its entirety.

The present application claims the benefit under 35 U.S.C. § 120 of U.S. patent application Ser. No. 15/494,230 filed Apr. 21, 2017, entitled SYSTEM AND METHOD FOR LOCATION DETERMINATION USING RECEIVED ADS-B ACCURACY DATA, which is incorporated herein by reference in the entirety.

TECHNICAL FIELD

The present disclosure relates generally to location determination, and, more particularly, to location accuracy data provided in ADS-B signals and GNSS signals.

BACKGROUND

In the United States, aircraft will be required to be equipped with equipment to transmit ADS-B Out signals position information by the year 2020. Similar requirements are being implemented globally such that the number of ADS-B compliant aircraft will continue to increase. ADS-B Out signals transmitted by compliant sources (e.g., aircraft, UAS devices, radio towers, or the like) may include, but are not required to include, position information (e.g., latitude and longitude), altitude, time (e.g., a time at which position is determined by Global Navigation Satellite System (GNSS)), velocity, and heading information. While ADS-B signals may provide exemplary positioning information, ADS-B technology depends on GNSS receivers to precisely determine the vehicle's position. As such, the accuracy of ADS-B systems, and therefore their ADS-B compliance, is dependent on the accuracy of their GNSS receivers.

Positioning systems provide a location of an aircraft system in absolute coordinates and/or relative coordinates (e.g., with respect to other aircraft, communication towers, or the like). However, typical positioning systems such as a GNSS may negatively impact the size, weight, power, and cost (SWAP-C) metrics of smaller or more mission-restricted aircraft. In particular, smaller aircraft such as unmanned aircraft systems (UAS), balloons, gliders, or light sport aircraft (LSA) may have design restrictions or insufficient resources to support GPS systems and the associated hardware. Because ADS-B capabilities are dependent on GNSS receiver capabilities, aircraft which are not able to support adequate GNSS systems may therefore be precluded from achieving ADS-B compliance. As such, there exists a need for a system and method which cure at least one of the shortcomings identified above.

SUMMARY

A mixed-mode positioning system for determining position data associated with a vehicle is disclosed, in accordance with one or more embodiments of the present disclosure. In one embodiment, the system includes one or more antenna elements couplable to a subject vehicle. In another embodiment, the system includes one or more receivers configured to receive GNSS signals and ADS-B signals. In another embodiment, the system includes a processor. In another embodiment, the processor extracts GNSS time difference of arrival (TDOA) data from the GNSS signals, extracts ADS-B TDOA data from the ADSOB signals, and determines ownship position data corresponding to the subject vehicle based on the extracted GNSS TDOA data and the ADS-B TDOA data in a common processing step.

A mixed-mode ADS-B positioning system is disclosed, in accordance with one or more embodiments of the present disclosure. In one embodiment, the system includes one or more antenna elements couplable to a subject vehicle. In another embodiment, the system includes a GNSS receiver configured to receive, via the one or more antenna elements, one or more GNSS signals and determine a first ownship position with a first value of an accuracy metric based on the one or more GNSS signals. In another embodiment, the system includes an Automatic Dependent Surveillance Broadcast (ADS-B) receiver configured to receive, via the one or more antenna elements, one or more ADS-B signals and determine a second ownship position with a second value of the accuracy metric based on the one or more GNSS signals. In another embodiment, the system includes a processor configured to determine a third ownship position based on a combination of the first ownship position and the second ownship position in which the third ownship position has a third value of the accuracy metric associated with a higher accuracy than the first value of the accuracy metric or the second value of the accuracy metric.

A method for determining position data associated with a vehicle is disclosed, in accordance with one or more embodiments of the present disclosure. In one embodiment, the method includes receiving, via one or more antenna elements, one or more GNSS signals. In another embodiment, the method includes receiving, via the one or more antenna elements, one or more ADS-B signals. In another embodiment, the method includes extracting GNSS position data from the one or more GNSS signals. In another embodiment, the method includes extracting ADS-B position data from the one or more ADS-B signals. In another embodiment, the method includes determining an ownship position corresponding to the subject vehicle based on the extracted GNSS position data and the extracted ADS-B position data.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention, and, together with the general description, serve to explain the principles of the invention.

BRIEF DESCRIPTION OF DRAWINGS

The numerous advantages of the disclosure may be better understood by those skilled in the art by reference to the accompanying figures in which:

FIG. 5 illustrates a process flow diagram depicting a method for determining the location of a vehicle with a mixed-mode positioning system, in accordance with one or more embodiments of the present disclosure.

DETAILED DESCRIPTION

Figure 1:
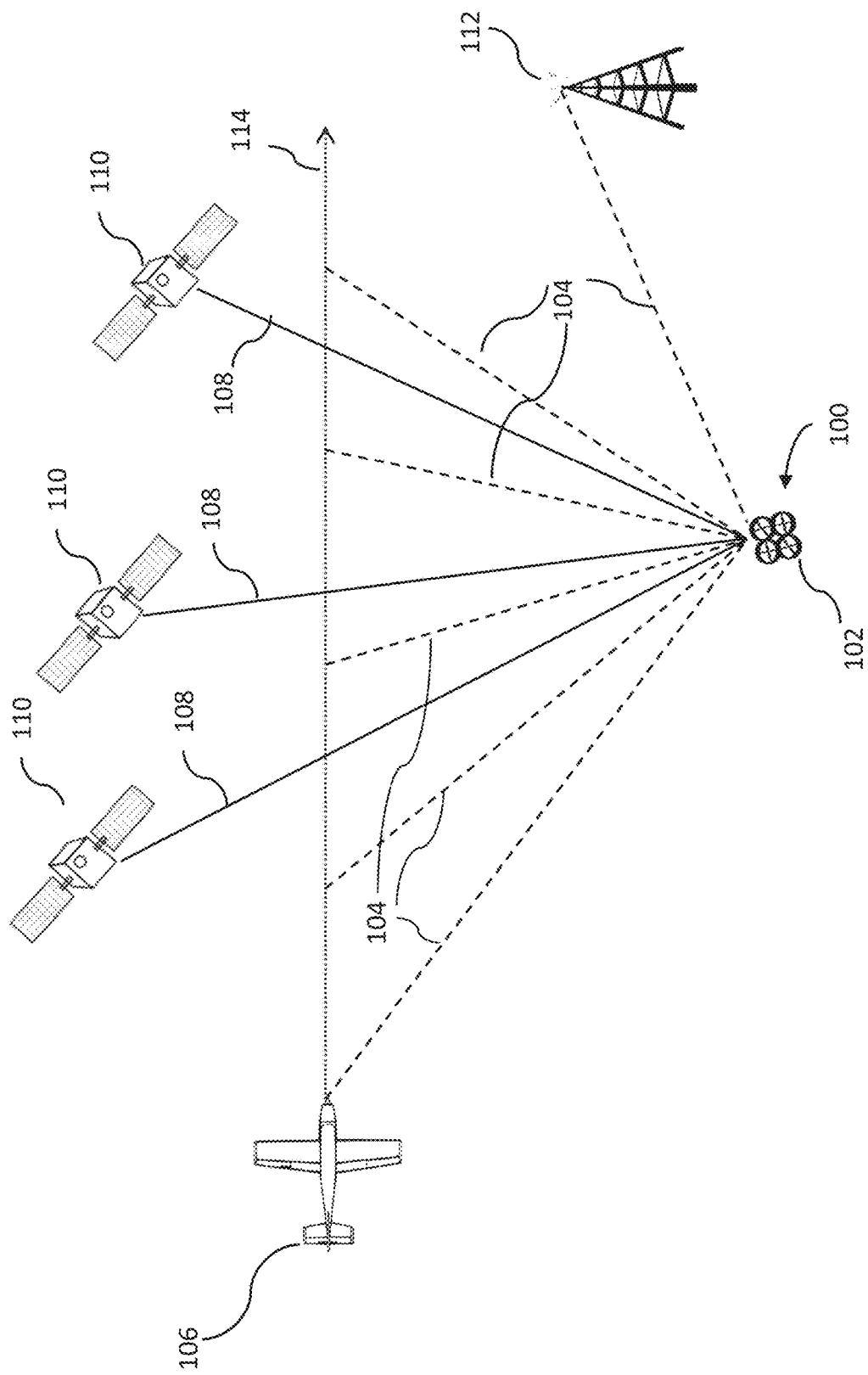
FIG. 1 illustrates a schematic diagram of ownship location determination using a mixed-mode positioning system, in accordance with one or more embodiments of the present disclosure.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and, together with the general description, serve to explain the principles of the invention.

Reference will now be made in detail to the subject matter disclosed, which is illustrated in the accompanying drawings.

Referring generally to FIGS. 1-5, systems and methods for determining the position of a subject vehicle are disclosed, in accordance with one or more embodiments of the present disclosure.

Embodiments of the present disclosure are directed to determining the position of a vehicle using a combination of Global Navigation Satellite System (GNSS) signals and Automated Dependent Surveillance-Broadcast (ADS-B) signals. Additional embodiments of the present disclosure are directed to augmenting a GNSS position signal with ADS-B signals.

It is recognized herein that ADS-B is a surveillance and positioning technology in which ADS-B compliant vehicles determine their positions via satellite navigation (e.g., GNSS) and broadcast their positions such that ground stations and/or other ADS-B enabled vehicles may receive the signals. In addition to position information, ADS-B signals transmitted by aircraft may include additional information such as the accuracy at which the position of the aircraft is known. For example, the accuracy of the position information may be represented by a containment radius (e.g., a confidence interval), within which the location of the vehicle is known according to a specific certainty. For instance, ADS-B signals may include a positional measurement (e.g., calculated position) of a vehicle, and a containment radius spanning a quarter-mile around the positional measurement, within which the actual location of the vehicle is known with 95% certainty. In this regard, ADS-B Out signals transmitted by compliant sources (e.g., aircraft, UAS devices, radio towers, or the like) may include, but are not required to include, positional information (e.g., latitude and longitude), accuracy metrics (e.g., containment radius, relative certainty, and the like), altitude, time stamped data (e.g., a time at which a GNSS-derived position is determined), velocity, heading information, and the like.

It is further recognized herein that, in the United States, all aircraft operating in airspace classes A, B, C, and E will be required to be ADS-B enabled by 2020. Thus, aircraft will be required to be able to receive ADS-B In signals, and transmit ADS-B Out signals. Similar requirements are being implemented globally such that the number of ADS-B compliant aircraft will continue to increase. Furthermore, it is noted that varying airspace classes (e.g., class A, class B, and the like) may have varying ADS-B capability threshold requirements. Threshold requirements may be differentiated according to how precisely aircraft may determine their location. For example, in low-populated airspaces, aircraft may not have to broadcast their location with high accuracy in order to be ADS-B compliant (e.g., a wide containment radius may be allowed). In this regard, low-populated airspace may have a low location accuracy threshold for ADS-B compliance. In comparison, in highly-populated airspace, aircraft may be required to broadcast their location via ADS-B Out signals with high accuracy (e.g., only aircraft able to determine their location within a small containment radius may be compliant). In this regard, highly-populated airspace may have a high location accuracy threshold for ADS-B compliance. In this regard, it is noted that the ability to determine an aircraft's position accurately and precisely is critical to determining allowable airspace classifications.

It is further noted that ADS-B technology typically relies on GNSS receivers in order to determine the precise position of the ADS-B capable vehicle. Thus, ADS-B capabilities (e.g., ADS-B accuracy) are typically limited by the corresponding GNSS receiver capabilities (e.g., GNSS accuracy). In this regard, aircraft equipped with highly accurate GNSS receivers are able to transmit their location with high accuracy via ADS-B signals, and vice versa.

It is further noted that, while commercial and other large aircraft may have the size and resources to accommodate the GPS systems and associated hardware of highly accurate GNSS receivers, smaller aircraft such as unmanned aircraft systems including, but not limited to, unmanned aircraft systems (UAS), balloons, gliders, light sport aircraft (LSA), and the like, may have design restrictions or insufficient resources to support GPS systems and the associated hardware. As such, smaller aircraft may be precluded from housing adequate GNSS receivers to achieve certain levels of ADS-B compliance.

Embodiments of the present disclosure are directed to augmenting a GNSS position signal with ADS-B signals transmitted from at least one other ADS-B enabled source (e.g., other ADS-B enabled aircraft, ADS-B enabled vehicles, ADS-B ground transceivers, and the like) in order to refine the positioning data received from a GNSS position signal. In this regard, the embodiments of the present disclosure are directed to improving the accuracy of GNSS positioning signals with ADS-B signals. In this regard, the accuracy of GNSS receivers may be improved. It is contemplated that the present disclosure may be used to bring GNSS receivers not in ADS-B compliance into ADS-B compliance by improving the position accuracy of the GNSS receivers. It is further contemplated that the present disclosure may particularly lend itself to smaller aircraft including, but not limited to, UAS, balloons, gliders, LSAs, and the like, which may be ill-equipped for large, powerful GNSS receivers.

FIG. 1 illustrates a schematic diagram of ownship location determination using a mixed-mode positioning system 100, in accordance with one or more embodiments of the present disclosure.

As shown in FIG. 1, a subject vehicle 102 equipped with a mixed-mode positioning system 100 may receive one or more ADS-B signals 104 from ADS-B emitting aircraft 106 and one or more GNSS signals 108 from one or more satellites 110.

A subject vehicle 102 may receive ADS-B signals 104 from any number of sources such as, but not limited to, one or more nearby ADS-B emitting aircraft 106 (e.g., aircraft equipped with ADS-B Out transponders), one or more radio towers 112, and the like. Further, a subject vehicle 102 may also be configured to receive one or more GNSS signals 108 from one or more satellites 110.

The subject vehicle 102 may utilize the received ADS-B signals 104 and GNSS signals 108 to determine its location (e.g., the ownship position of the subject vehicle 102) relative to the positions of the ADS-B emitting aircraft 106 and the satellites 110. The subject vehicle 102 may further determine ownship position in absolute coordinates (e.g., in terms of latitude, longitude, elevation, and the like). For example, the absolute positions of the ADS-B emitting aircraft 106 and the satellites 110 may be provided by the ADS-B signals 104 and the GNSS signals 108 and utilized by the subject vehicle 102 to determine ownship position in absolute coordinates.

Figure 2:
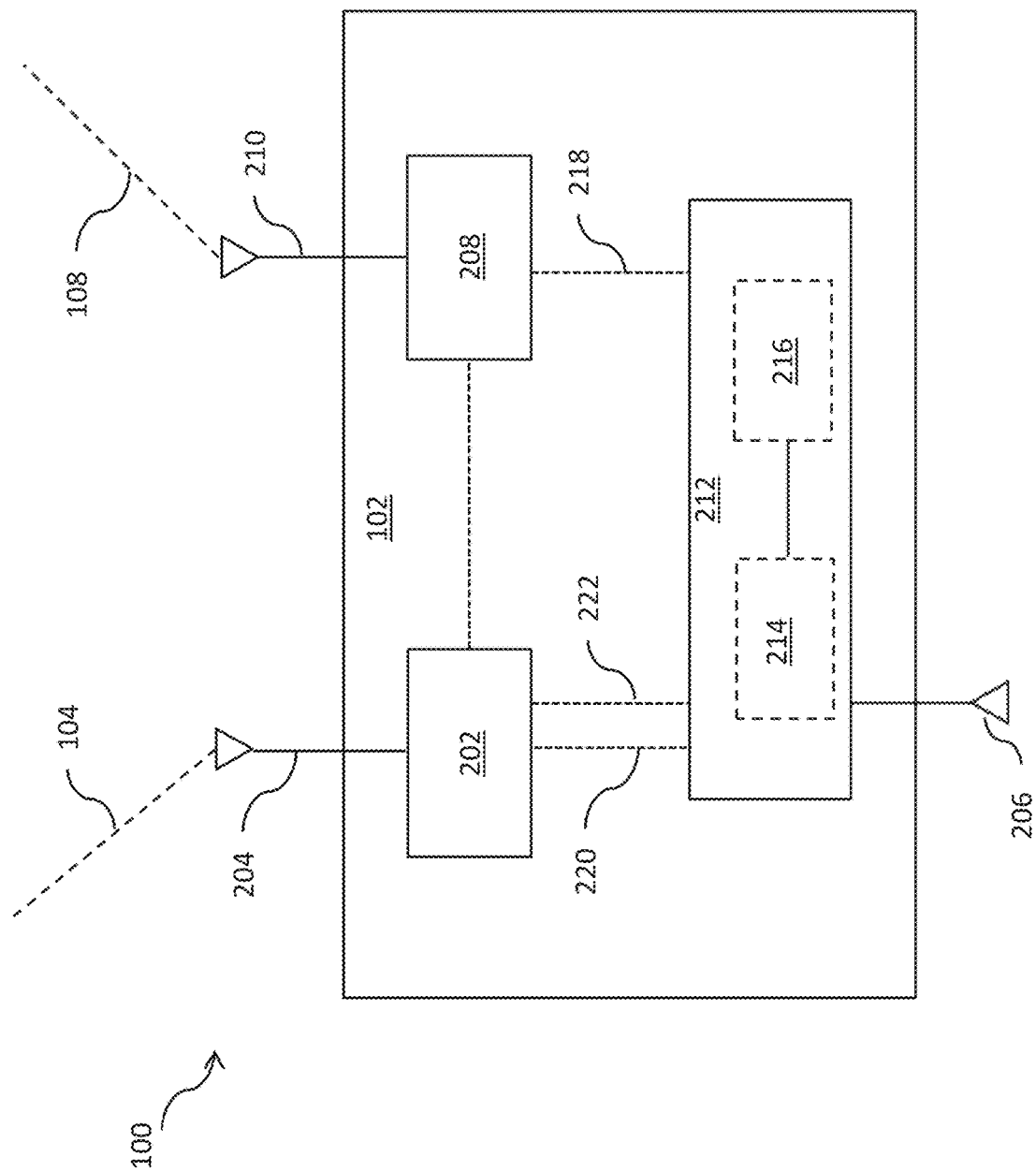
FIG. 2 illustrates a simplified block diagram of a mixed-mode positioning mixed-mode positioning system, in accordance with one or more embodiments of the present disclosure.

FIG. 2 illustrates a simplified block diagram of a mixed-mode positioning system 100, in accordance with one or more embodiments of the present disclosure.

In one embodiment, a mixed-mode positioning system 100 coupled to the subject vehicle 102 includes ADS-B receiver 202, ADS-B In antenna 204, ADS-B Out antenna 206, GNSS receiver 208, GNSS antenna 210, and a controller 212. The controller 212 may include one or more processors 214 and memory 216.

Although much of the present disclosure is directed toward a mixed-mode positioning mixed-mode positioning system 100 located on a subject vehicle 102, this is not to be interpreted as a limitation of the present disclosure. It is noted that, in some embodiments, one or more elements of the mixed-mode positioning system 100 may be located external to the subject vehicle 102 without departing from the spirit or scope of the present disclosure. In this regard, the position of the subject vehicle 102 may be at least partially determined by a controller 212 located external to the subject vehicle 102.

The GNSS receiver 208 may be coupled to one or more GNSS antennas 210. In another embodiment, GNSS receiver 208 may be configured to receive, via one or more GNSS antennas 210, one or more GNSS signals 108. It is noted that ADS-B In antenna 204, GNSS antenna 210, and ADS-B Out antenna 206 (generally, "antennas 204, 206, 210") may include any antenna elements known in the art. For example, the antennas 204, 206, 210 may include, but are not limited to, one or more omnidirectional antennas, one or more directional antennas, and the like. By way of another example, the mixed-mode positioning mixed-mode positioning system 100 may include a combination of omnidirectional and directional elements to provide for wide-angle scanning for available signals and narrow-angle reception of desired signals. Further, the GNSS receiver 208 and the ADS-B receiver 202 may include one or more radio elements and/or a software-defined radio to receive and/or process the GNSS signals 108 and/or the ADS-B signals 104. Furthermore, it is noted that antennas 204, 206, 210 may each be separate antennas. Alternatively, it is contemplated that the antennas 204, 206, 210 may be combined into one or more antennas without departing from the spirit or scope of the present disclosure. For example, ADS-B In antenna 204 and ADS-B Out antenna 206 may include one single "ADS-B antenna," which may be configured to both receive ADS-B signals 104 and transmit ADS-B Out signals (not shown). By way of another example, antennas 204, 206, 210 may include a single "ADS-B/GNSS antenna" (not shown).

The GNSS receiver 208 may receive GNSS signals 108 at any frequency such as, but not limited to, 1575.42 MHz, 1227.60 MHz, and the like. The GNSS receiver 208 may be configured to receive one or more GNSS signals 108 from any number of GNSS satellites 110 associated with a GNSS-based positioning system. For example, GNSS satellites 110 may include satellites from a GNSS-based positioning system such as, but not limited to the Global Positioning System (GPS) (e.g., the GPS standard positioning service (SPS), the GPS precise positioning service (PPS)) or Global Navigation Satellite System (GLONASS). Further, the GNSS signals 108 may include data associated with a GNSS positioning algorithm such as, but not limited to, position measurements, accuracy metrics, time information, health data associated with the GNSS satellites 110, orbital information, error correction information, or augmentation signals (e.g., WAAS signals, space-based augmentation system (SBAS) signals, ground based augmentation system (GBAS) signals, or the like).

It is recognized herein that a GNSS receiver (e.g., GNSS receiver 208) may determine its location and thus the ownship position of the subject vehicle 102 using any method known in the art such as, but not limited to, a multilateration (MLAT) technique. MLAT is a hyperbolic technique in which the location of the subject vehicle 102 may be determined as the intersection between hyperboloids defined by time difference of arrival (TDOA) of simultaneously-emitted transmission signals (e.g., GNSS signals 108). For example, the separation distance between the subject vehicle 102 and GNSS satellites 110 is related to the transit time of a transmission signal from GNSS satellites 110 to the subject vehicle 102. Further, a TDOA of transmission signals simultaneously emitted from multiple known may be processed to determine location information of the subject vehicle 102. In this regard, GNSS receiver 208 may receive GNSS signals 108 and may determine a positional measurement of the subject vehicle 102 (e.g., an ownship position of the subject vehicle 102) relative to the positions of the satellites 110. Further, since the absolute positions of the satellites 110 are known to a high accuracy, the position of the subject vehicle 102 may be determined with a high accuracy in absolute coordinates, which may include longitude data, latitude data, altitude data, and the like.

The GNSS receiver 208 may further provide one or more accuracy metrics to describe an accuracy with which a position measurement is determined. In addition to positional measurement data, GNSS signals 108 may also include relative accuracy metrics indicative of the level of accuracy of the positional data. For example, GNSS signals 108 may include a positional measurement of subject vehicle 102 (e.g., calculated position). Additionally, GNSS signals 108 may also include accuracy metrics indicating that the positional measurement is accurate within a certain confidence parameter and that the actual location of the subject vehicle may be found within a certain containment radius around the calculated positional measurement. The GNSS receiver 208 may further provide values for any positional accuracy metric known in the art such as, but not limited to, a horizontal position error (HPE), a vertical position error (VPE), a navigation accuracy category for position (NAC-P), a navigation accuracy category for velocity (NAC-v), a Navigation Integrity Category (NIC), a source integrity level (SIL), a system design assurance (SDA) value, or one or more latency values. The accuracy metrics may be determined based on the particular specifications of a particular GNSS receiver 208 and/or by the received GNSS signals 108 (e.g., a quantity of GNSS signals 108, a fidelity of GNSS signals 108, or the like).

It is noted that GNSS receiver 208 may include any type of GNSS receiver known in the art. For example, the GNSS receiver 208 may be equipped with GNSS integrity-checking capabilities such as, but not limited to Receiver Autonomous Integrity Monitoring (RAIM). By way of another example, the GNSS receiver 208 may be equipped with augmentation capabilities such as, but not limited to, Wide Area Augmentation System (WAAS), Satellite-Based Augmentation System (SBAS), Ground-Based Augmentation System (GBAS), or the like.

The GNSS receiver 208 may provide a GNSS output signal 218 including any data utilized and/or generated by the GNSS receiver 208 such as, but not limited to, position data of the subject vehicle 102 based on the GNSS signals 108, the GNSS signals 108 signals themselves, one or more calculated values based on the GNSS signals 108 (e.g., TDOA values, timestamps, positions of satellites 110, or the like).

In another embodiment, ADS-B receiver 202 may be coupled to ADS-B In antenna 204. Accordingly, ADS-B receiver 202 may be configured to receive, via the ADS-B In antenna 204, one or more ADS-B signals 104 on any frequency such as, but not limited to, 1090 MHz or 978 MHz. In one embodiment, ADS-B signals 104 received by ADS-B In antenna 204 may include data indicative of the position (e.g., latitude, longitude, altitude, and the like), speed, and heading of the sources transmitting the ADS-B signals 104 (e.g., ADS-B emitting aircraft 106, radio towers 112, or the like). Furthermore, the ADS-B signals 104 may include, but are not required to include, positional measurement accuracy metrics (e.g., containment radius, relative certainty, NAC-P, NAC-V, NIC, SIL, and the like) associated with the transmission source. Still further, the ADS-B signals 104 received by ADS-B In antenna 204 may include time-stamped data. Time-stamped data may include data regarding the times at which the ADS-B emitting sources transmitted the ADS-B signals 104, the time at which the other ADS-B enabled sources determined their respective positions via GNSS (e.g., a GNSS receiver associated with an ADS-B emitting aircraft 106), and the like.

Figure 3:
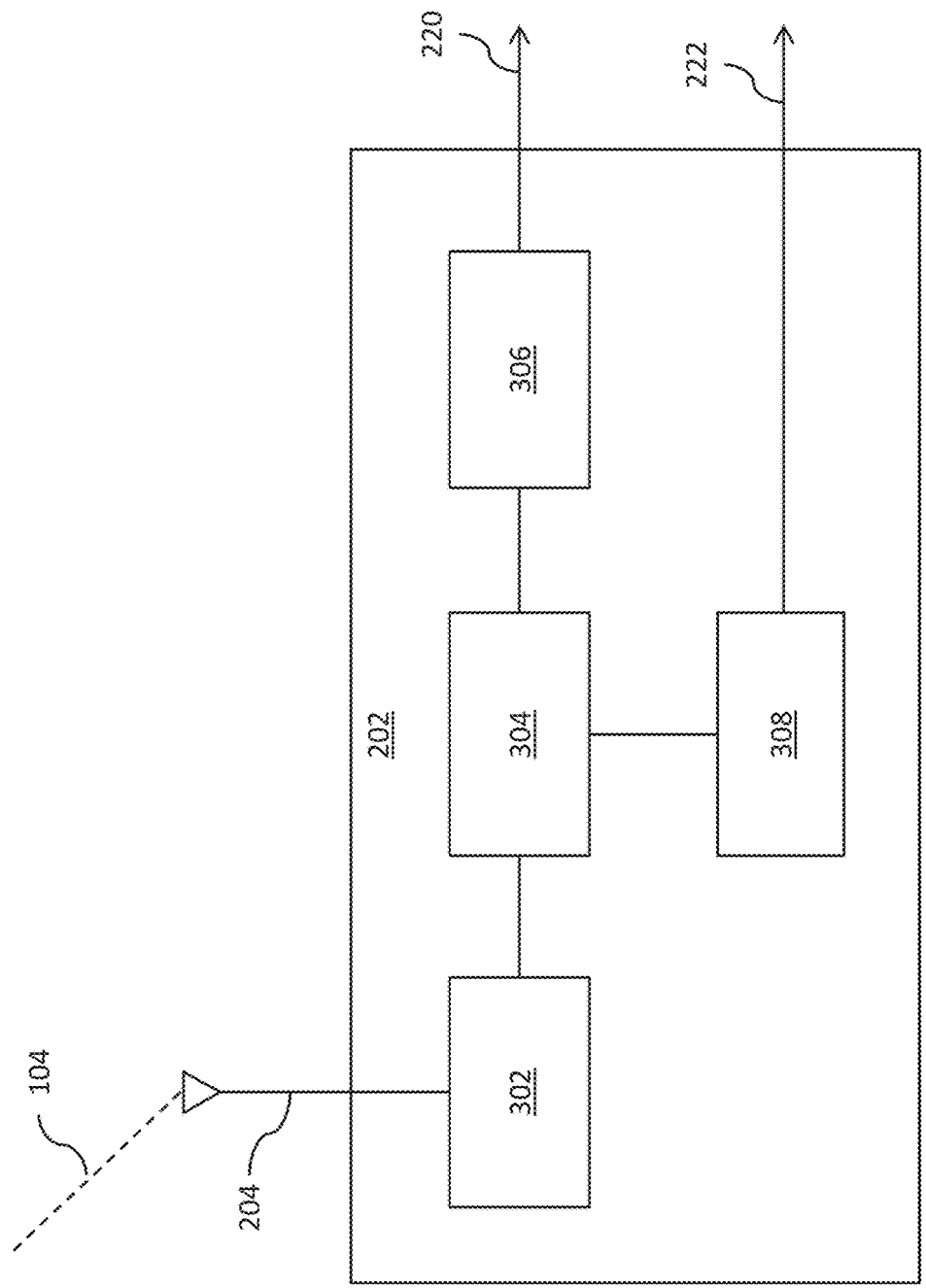
FIG. 3 illustrates a simplified block diagram of an ADS-B receiver, in accordance with one or more embodiments of the present disclosure.

FIG. 3 illustrates a simplified block diagram of an ADS-B receiver 202, in accordance with one or more embodiments of the present disclosure.

In one embodiment, ADS-B receiver 202 may include an RF receiver 302, a correlator 304, a framer 306, and a timer 308.

In one embodiment, ADS-B receiver 202 may be configured to receive ADS-B signals 104 via RF receiver 302. It is noted that RF receiver 302 may include any RF receiving device known in the art. The ADS-B receiver 202 may further process and decode the received ADS-B signals 104 to extract relevant data for the determination of the ownship position of the subject vehicle 102. For example, the RF receiver 302, the correlator 304, and the framer 306 may extract ADS-B signal packets 220 from ADS-B signals 104 such that the data encoded within the ADS-B signals 104 may be decoded (e.g., by a software decoder, a hardware decoder, or the like). The ADS-B signal packets 220 may include position data (e.g., latitude, longitude, altitude, or the like), velocity data (e.g., speed, heading, or the like), a time at which GNSS position data of the ADS-B sources (e.g., ADS-B emitting aircraft 106, or the like) is determined, or a time at which ADS-B signals 104 are transmitted from the ADS-B sources.

In some embodiments, the timer 308 determines ADS-B signal timing data 222 (e.g., a time at which ADS-B signals 104 are sent by ADS-B emitting sources, a time at which ADS-B signals 104 are received by the subject vehicle 102, or the like). For example, the ADS-B receiver 202 may include a 32-bit timer driven by a 48 MHz clock signal, or the like. Further, the timer 308 may be linked to a reference clock (e.g., a corrected universal time (UTC) clock, or the like). Accordingly, the ADS-B signal timing data 222 may be utilized by the mixed-mode positioning system 100 to determine TDOA signals based on received ADS-B signals 104 suitable for the determination of position of the subject vehicle 102 (e.g., using MLAT, or the like).

Returning to FIG. 2, in another embodiment, timer 308 is configured to transmit ADS-B signal timing data 222 to the one or more processors 214. In this regard, ADS-B receiver 202 may be configured to transmit ADS-B signal packets 220 and ADS-B signal timing data 222 to one or more processors 214. Furthermore, processors 214 may be configured to receive the ADS-B signal packets 220 and ADS-B signal timing data 222 in order to extract the positional data from the ADS-B signals 104.

The controller 212 may receive output information from the GNSS receiver 208 (e.g., GNSS signals 108, GNSS output signal 218, and the like) and the ADS-B receiver 202 (e.g., ADS-B signals 104, ADS-B signal packets 220, ADS-B signal timing data 222 and the like), to determine the position of the subject vehicle 102. In one embodiment, the one or more processors 214 may be configured to execute a set of program instructions stored in memory 216 to cause the one or more processors 214 to carry out one or more steps of the present disclosure.

The one or more processors 214 of controller 212 may include any one or more processing elements known in the art. In this sense, the one or more processors 214 may include any microprocessor-type device configured to execute software algorithms and/or instructions. In one embodiment, the one or more processors 214 may consist of a desktop computer, mainframe computer system, workstation, image computer, parallel processor, or other computer system (e.g., networked computer) configured to execute a program configured to operate the mixed-mode positioning system 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from memory 216. Moreover, different subsystems of the mixed-mode positioning system 100 (e.g., GNSS receiver 208, ADS-B receiver 202, and the like) may include processor or logic elements suitable for carrying out at least a portion of the steps described throughout the present disclosure. Therefore, the above description should not be interpreted as a limitation on the present disclosure but merely an illustration.

The memory 216 may include any storage medium known in the art suitable for storing program instructions executable by the associated one or more processors 214. For example, the memory 216 may include a non-transitory memory medium. For instance, the memory 216 may include, but is not limited to, a read-only memory, a random access memory, a magnetic or optical memory device (e.g., disk), a magnetic tape, a solid state drive and the like. In another embodiment, the memory 216 is configured to store data from one or more ADS-B signals 104, GNSS signals 108, and/or the output of the various steps described herein. It is further noted that memory 216 may be housed in a common controller housing with the one or more processors 214. In an alternative embodiment, the memory 216 may be located remotely with respect to the physical location of the processors and controller 212 For instance, the one or more processors 214 of controller 212 may access a remote memory (e.g., server), accessible through a network (e.g., internet, intranet and the like). In another embodiment, the memory 216 maintains program instructions for causing the one or more processors 214 to carry out the various steps described through the present disclosure.

The mixed-mode positioning system 100 may determine position data of the subject vehicle 102 (e.g., the ownship position of the subject vehicle 102) in a variety of ways based on the received GNSS signals 108 and ADS-B signals 104 signals.

In one embodiment, the mixed-mode positioning system 100 separately generates position data based on the GNSS signals 108 and the ADS-B signals 104. In this regard, the mixed-mode positioning system 100 may generate a first position dataset based on the received GNSS signals 108 and a second position dataset based on the received ADS-B signals 104. In another embodiment, the mixed-mode positioning system 100 combines the position data based on the GNSS signals 108 and the ADS-B signals 104 to generate output position data. Further, the mixed-mode positioning system 100 may generate a combined position dataset based on a combination of the first and second position datasets. In one instance, the one or more processors 214 may modify one or more performance characteristics of the first position dataset (e.g., accuracy, integrity, or the like) based on the second position dataset.

For example, the mixed-mode positioning system 100 may generate a first position dataset (e.g., including ownship position data, values of an accuracy metric, and the like) based on received GNSS signals 108. In one instance, the first position dataset may be generated using the GNSS receiver 208 configured to directly generate position and accuracy data as a GNSS output signal 218. In another instance, the first position dataset may be generated at least in part by a separate controller (e.g., controller 212). In this regard, the controller may utilize data from the GNSS signals 108 provided by the GNSS receiver 208 such as, but not limited to, timestamp data and positions of the satellites 110 suitable for generating a TDOA signal. Accordingly, the controller may use an MLAT technique to generate ownship position data based the GNSS signals 108.

Further, the mixed-mode positioning system 100 may generate a second position dataset (e.g., including position data, values of an accuracy metric, and the like) based on received ADS-B signals 104. In one instance, the mixed-mode positioning system 100 may, but is not required to, generate the second position dataset using an MLAT technique based on TDOA information from the ADS-B signal packets 220 and/or the ADS-B signal timing data 222 provided by the ADS-B receiver 202.

Figure 4:
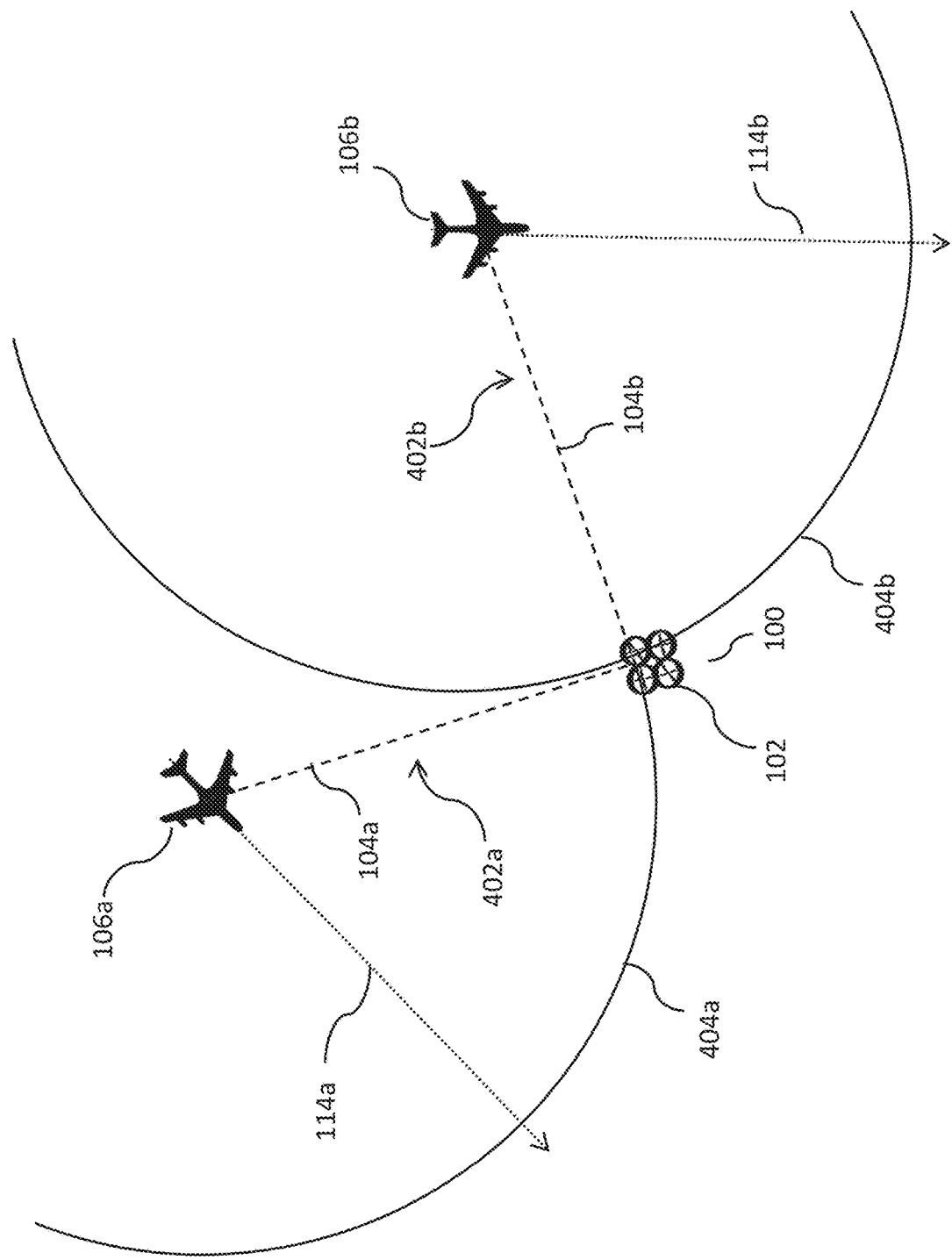
FIG. 4 illustrates a simplified schematic diagram illustrating the reception of ADS-B signals from ADS-B emitting aircraft for position determination using an MLAT technique, in accordance with one or more embodiments of the present disclosure.

FIG. 4 illustrates a simplified schematic diagram illustrating the reception of ADS-B signals from ADS-B emitting aircraft for position determination using an MLAT technique, in accordance with one or more embodiments of the present disclosure.

For example, a first ADS-B emitting aircraft 106a traveling along a first trajectory 114a may emit an ADS-B signal 104a that may be received by the subject vehicle 102. Accordingly, the mixed-mode positioning system 100 may extract a time of arrival (TOA) signal associated with a first separation distance 402a between the ADS-B emitting aircraft 106a and the subject vehicle 102. In this regard, the mixed-mode positioning system 100 may determine the position of the subject vehicle 102 to be at some point along a contour 404a with a radius equal the separation distance 402a centered at the position of the ADS-B emitting aircraft 106a (e.g., a position encoded within the received ADS-B signal 104a).

Similarly, a second ADS-B emitting aircraft 106b traveling along a first trajectory 114b may emit an ADS-B signal 104b that may be received by the subject vehicle 102. The mixed-mode positioning system 100 may thus extract a TOA signal associated with a second separation distance 402b between the ADS-B emitting aircraft 106b and the subject vehicle 102. In this regard, the mixed-mode positioning system 100 may determine the position of the subject vehicle 102 to be at some point along a contour 404b with a radius equal the separation distance 402b centered at the position of the ADS-B emitting aircraft 106b (e.g., a position encoded within the received ADS-B signal 104b). In this regard, the mixed-mode positioning system 100 may determine the position of the subject vehicle 102 to be at an intersection of contour 404a and contour 404b (e.g., using an MLAT algorithm, or the like) by generating a TDOA signal associated with a time difference of arrival of the TOA signal from the ADS-B signal 104a and the TOA signal from the ADS-B signal 104b.

Further, a single TDOA measurement may locate the ownship position of the subject vehicle 102 to a hyperboloid, two TDOA measurements locate the ownship position of the subject vehicle 102 to a curve associated with the intersection of two hyperboloids, and three TDOA measurements locate the ownship position of the subject vehicle 102 to a single point. In general, the number of TDOA measurements may be one less than the number of received transmission signals. For example, two transmission signals may yield a single TDOA measurement, three transmission signals may yield two TDOA measurements, and so on. In some embodiments, the mixed-mode positioning system 100 may utilize four or more TDOA measurements in order to overcome errors associated with the TDOA measurements. In this regard, location determination using MLAT may be an overdetermined system in which the location of the subject vehicle 102 may be known with a high degree of accuracy.

Referring again to FIG. 1, the mixed-mode positioning system 100 may generate position data for the subject vehicle 102 based on sequential ADS-B signals 104 from a single ADS-B emitting source (e.g., ADS-B emitting aircraft 106). For example, an ADS-B emitting aircraft 106 travelling along a trajectory 114 periodically emit ADS-B signals 104 associated with updated positions of the ADS-B emitting aircraft 106 along the trajectory 114 at a fixed period (e.g., a reciprocal of an ADS-B emission frequency or a distance travelled by the ADS-B emitting aircraft 106 between ADS-B transmissions. Accordingly, mixed-mode positioning system 100 may utilize the sequentially-received ADS-B emitting aircraft 106 to determine the position of the subject vehicle 102.

In another embodiment, the mixed-mode positioning system 100 may utilize sequentially-received ADS-B signals 104 to determine a single position measurement. It is recognized herein that the mixed-mode positioning system 100 may determine the position of the subject vehicle 102 within a certain accuracy (e.g., an HPE, a NAC-P, or the like). In this regard, the mixed-mode positioning system 100 may determine the position of the subject vehicle 102 within a certain containment radius within a certain confidence parameter. Accordingly, the mixed-mode positioning system 100 may utilize a sliding window of sequentially-received ADS-B signals 104 to generate position data of the subject vehicle 102.

Similarly, the mixed-mode positioning system 100 on a subject vehicle 102 in motion past radio towers 112 may utilize sequentially-received ADS-B signals 104 from the radio towers 112 to determine ownship position.

In another embodiment, the mixed-mode positioning system 100 (e.g., via the controller 212) determines output ownship position data (e.g., output position data and at least one accuracy metric) corresponding to the subject vehicle 102 based on the extracted GNSS position data and ADS-B position data.

It is noted that the controller 212 may determine the position of the subject vehicle 102 based on the extracted GNSS positional data and the extracted ADS-B positional data using any mathematical relationship known in the art for combining signals. For example, one or more processors 214 may take the average positional measurement of the extracted GNSS positional data and the extracted ADS-B positional data in order to determine the position of the subject vehicle 102. By way of another example, the controller 212 may determine a midpoint of a GNSS-derived position measurement and an ADS-B-derived position measurement to determine the position of subject vehicle 102.

By way of another example, the controller 212 may determine the position of the subject vehicle 102 based on weighted averages of the extracted GNSS positional data and the extracted ADS-B positional data. For instance, if the positional measurement for the subject vehicle 102 based on extracted ADS-B positional data is twice as accurate based on a selected accuracy metric (e.g., containment radius, HPE, NAC-P, or the like) as the positional measurement for the subject vehicle 102 based on extracted GNSS positional data, the one or more processors 214 may weigh the positional measurement based on extracted ADS-B positional data twice as heavily. It is to be understood that the examples for combining GNSS position data and ADS-B position data above are provided solely for illustrative purposes and should not be interpreted as limiting. The controller 212 may utilize any mathematical relationship to combine extracted ADS-B positional data and extracted GNSS positional data in order to determine the position of subject vehicle 102 without departing from the scope and spirit of the present disclosure.

It is noted that the controller 212 may determine the position of subject vehicle 102 based on based on the extracted GNSS positional data and the extracted ADS-B positional data based on any number of factors. The factors which may influence how the one or more processors 214 determine the location of subject vehicle 102 may include, but are not limited to, positional measurements from GNSS and ADS-B positional data, accuracy metrics of the GNSS and ADS-B positional data (e.g., containment radii, confidence parameters, and the like), interference conditions (e.g., weather conditions, terrestrial interferences, signal interferences, and the like), relative interference effects between the ADS-B signals 104 and GNSS signals 108 (e.g., relative strength of each signal, the extent to which interferences negatively affect each signal, and the like), the number of proximate ADS-B emitting aircraft 106 and other ADS-B transmitting sources, the position accuracy threshold level for ADS-B compliance for a particular airspace class, and the like.

In another embodiment, the one or more processors 214 may generate hybrid positional data (e.g., ownship position and at least one accuracy metric) based on a combination of GNSS signals 108 and ADS-B signals 104 in a common processing step. For example, the one or more processors 214 may determine TOA signals (e.g., associated with an MLAT algorithm, or the like) for GNSS signals 108 from GNSS satellites 110 as well as ADS-B signals 104 from ADS-B emitting aircraft 106. The controller 212 may further generate TDOA signals using any combination of GNSS-derived TOA signals or ADS-B-derived TOA signals. In this regard, the controller 212 may perform a multilateration technique based on any available combination of GNSS signals 108 and ADS-B signals 104.

It is noted that the mixed-mode positioning system 100 may determine the position of the subject vehicle 102 (e.g., based on separate GNSS and ADS-B derived position data that is combined to generate output position data or based on output data derived using the GNSS signals 108 and the ADS-B signals 104 in a common process step) with higher performance characteristics (e.g., accuracy, integrity, or the like) than achievable using either of the received GNSS signals 108 or the ADS-B signals 104 independently. For example, the controller 212 may be configured to determine the position of the subject vehicle 102 based on the extracted GNSS position data with a first value of a selected accuracy metric (e.g., SIL, HPE, NAC-P, or the like) and further determine the position of the subject vehicle 102 based on the extracted ADS-B position data with a second value of the selected accuracy metric. Accordingly, the controller 212 may determine the output position data with a third value of the selected accuracy metric in which the third value of the selected accuracy metric provides a greater degree of accuracy than either the first or second values. For example, considering a containment radius as an illustrative example of an accuracy metric, the third value of the containment radius may be smaller than the first value and the second value.

It is further noted that the mixed-mode positioning system 100 may improve the performance of a low-cost GNSS receiver 208 such that it may meet or exceed the capabilities of an advanced GNSS receiver 208 (e.g., a GNSS receiver 208 having integrity-checking capabilities (e.g., RAIM, or the like) or augmentation capabilities (e.g., WAAS, GBAS, or the like). In this regard, a UAS may augment a GNSS receiver that does not meet a desired level of certification (e.g., a desired SIL suitable for providing ADS-B out signals in a desired airspace) with an ADS-B receiver to meet the desired level of certification.

By way of an example, the one or more processors 214 may further improve the performance characteristics of an advanced GNSS receiver 208 (e.g., a GNSS receiver 208 having integrity-checking capabilities (e.g., RAIM, or the like) or augmentation capabilities (e.g., WAAS, GBAS, or the like). For instance, the mixed-mode positioning system 100 may be configured to improve one or more location accuracy metrics including, but not limited to, Source Integrity Level (SIL), Navigation Integrity Category (NIC), Navigation Accuracy Category for Position (NAC-P), Navigation Accuracy Category for Velocity (NAC-V), and the like. In one embodiment, as noted previously herein, the mixed-mode positioning system 100 may improve the performance of a stand-alone GNSS receiver 208 by using ADS-B positional data to reduce the positional containment radius determined by the GNSS receiver 208.

In another embodiment, the one or more processors 214 of mixed-mode positioning system 100 may be able to more accurately determine the position of a subject vehicle 102 by using data from both GNSS signals 108 and ADS-B signals 104 as compared to using the data from either set of signals individually. For example, weather conditions may exist such that they negatively affect either GNSS signals 108 or ADS-B signals 104 more significantly than the other. For instance, a weather cell may significantly deteriorate GNSS signals 108, but have virtually no effect on ADS-B signals 104 (or vice versa). In this regard, mixed-mode positioning system 100 may be able to continue to accurately determine the position of the subject vehicle 102 by relying more heavily on the un-impaired ADS-B signals 104. It is noted that, in this example, mixed-mode positioning system 100 may be able to more accurately determine the position of a subject vehicle 102 than a system which relies solely on GNSS signals 108 or ADS-B signals 104, which may be negatively affected by the weather cell.

While the foregoing focused primarily on weather conditions, it is noted that mixed-mode positioning mixed-mode positioning system 100 may allow the location of a subject vehicle 102 to be determined more accurately than previous systems when exposed to a wide array of potential conditions which may negatively affect signal strength, including, but not limited to, interfering signals, terrestrial interferences, and the like.

It is noted that, in some embodiments, the position accuracy of the mixed-mode positioning mixed-mode positioning system 100 may vary depending on the number of ADS-B emitting aircraft 106 and other ADS-B enabled sources in proximity to the subject vehicle 102. As noted previously herein, ADS-B signals 104 from one separate ADS-B enabled source may be able to narrow the location of the subject vehicle 102 to a circle with a particular radius. Similarly, ADS-B signals 104 from two separate ADS-B enabled sources may be able to narrow the location of the subject vehicle 102 to two separate points, and ADS-B signals 104 from three separate ADS-B enabled sources may be able to narrow the location of the subject vehicle 102 to a single point. In this regard, it is noted that additional ADS-B signals 104 from additional ADS-B enabled sources may translate to improved position accuracy. In this regard, mixed-mode positioning mixed-mode positioning system 100 may be able to more accurately determine the location of subject vehicle 102 in areas with a high density of ADS-B emitting sources relative to areas with a low density of ADS-B emitting sources.

Relating to the previous example above, it is noted that, as number of ADS-B compliant aircraft continues to increase, the number of ADS-B signals 104 will also increase, which may allow mixed-mode positioning mixed-mode positioning system 100 to become increasingly more accurate in determining the location of a subject vehicle 102.

FIG. 5 illustrates a process flow diagram depicting a method 500 for determining the location of a vehicle with a mixed-mode positioning system, in accordance with one or more embodiments of the present disclosure.

It is noted herein that the steps of method 500 may be implemented all or in part by the mixed-mode positioning system 100. It is further recognized, however, that the method 500 is not limited to the mixed-mode positioning system 100 in that additional or alternative system-level embodiments may carry out all or part of the steps of method 500.

A step 502 may include receiving, via one or more antenna elements, one or more GNSS signals. The GNSS signals may include signals from one or more satellites suitable for providing positional information of a receiving device (e.g., using a multilateration technique). GNSS signals may include data associated with a GNSS positioning algorithm such as, but not limited to, satellite position measurements, accuracy metrics, time-stamped information, health data associated with the GNSS satellites, orbital information, error correction information, augmentation signals (e.g., wide area augmentation system (WAAS) signals, space-based augmentation system (SBAS) signals, ground based augmentation system (GBAS) signals, and the like), and the like.

The one or more antenna elements may include, but are not limited to, one or more omnidirectional antennas, one or more directional antennas, and the like. By way of an example, the one or more antennas may include a combination of omnidirectional and directional elements to provide for wide-angle scanning for available signals and narrow-angle reception of desired signals.

A step 504 may include receiving, via the one or more antenna elements, one or more ADS-B signals. The ADS-B signals may correspond to ADS-B out signals provided by aircraft, radio towers, or the like. ADS-B signals transmitted by compliant sources (e.g., aircraft, UAS devices, radio towers, or the like) may include, but are not required to include, positional information (e.g., latitude and longitude), positional measurement accuracy metrics (e.g., containment radius, relative certainty, and the like), altitude, time stamped data (e.g., a time at which a GNSS-derived position is determined), velocity, heading information, and the like.

A step 506 may include extracting GNSS position data from the one or more GNSS signals. For example, extracting GNSS position data may include determining a position of the receiver via a standard GNSS positioning technique such as, but not limited to MLAT. By way of another example, extracting GNSS position data may include passing through data provided in the GNSS signals (e.g., timing data, positions of satellites, TOA signals, and the like) suitable for processing.

A step 508 may include, ADS-B position data is extracted from the one or more ADS-B signals. For example, extracting ADS-B position data may include determining a position of the receiver via a positioning technique such as, but not limited to MLAT. By way of another example, extracting ADS-B position data may include passing through data provided in the ADS-B signals (e.g., timing data, positions of ADS-B sources, TOA signals, and the like) suitable for processing.

A step 510 may include determining an ownship position corresponding to the subject vehicle based on the extracted GNSS position data and the extracted ADS-B position data. For example, an ownship position may be determined by utilizing position measurements (e.g., including values associated with at least one accuracy metric) based on the GNSS position data and the ADS-B position data. In one instance, position measurements based on the GNSS position data and the ADS-B position data may be combined using an averaging technique. Further, weights may be assigned to datapoints of the GNSS position data and the ADS-B position data based on multiple factors such as, but not limited to, accuracy metrics associated with the datapoints. In this regard, the step 510 may include calculating a weighted average of the GNSS position data and the ADS-B position data. By way of another example, TOA signals associated with the GNSS position data and the ADS-B position data may be analyzed in a single processing step to determine output position data (e.g., using a multilateration technique, or the like).

It is recognized herein that the steps associated with method 500 may facilitate the determination of ownship position of a device such as, but not limited to, a UAS using a combination of GNSS and ADS-B signals. In this regard, low-cost and/or low weight components (e.g., GNSS receivers, or the like) that do not meet a desired performance specification (e.g., a selected SIL level, a selected NAC-P value, or the like) may be augmented with ADS-B signals to meet the desired performance specification.

All of the methods described herein may include storing results of one or more steps of the method embodiments in a storage medium. The storage medium may include any storage medium described herein or any other suitable storage medium known in the art. After the results have been stored, the results can be accessed in the storage medium and used by any of the method or system embodiments described herein, formatted for display to a user, used by another software module, method, or system, and the like It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed is:

1. A mixed-mode ADS-B positioning system, comprising:
one or more antenna elements couplable to a subject vehicle;
a Global Navigation Satellite System (GNSS) receiver coupled to the one or more antenna elements, the GNSS receiver configured to receive, via the one or more antenna elements, one or more GNSS signals, the GNSS receiver further configured to determine a first ownship position with a first value of an accuracy metric based on the one or more GNSS signals;
an Automatic Dependent Surveillance Broadcast (ADS-B) receiver coupled to the one or more antenna elements, the ADS-B receiver configured to receive, via the one or more antenna elements, one or more ADS-B signals, the ADS-B receiver further configured to determine a second ownship position with a second value of the accuracy metric based on the one or more ADS-B signals;
and
a processor configured to determine a third ownship position based on a combination of the first ownship position and the second ownship position, by:

assigning a first weight to the first ownship position based on the first value of the accuracy metric;

assigning a second weight to the second ownship position performing a weighted average of the first ownship position and the second ownship position based on a second value of the accuracy metric; and calculating a weighted average of the first ownship position and the second ownship position based on the first weight and the second weight to generate the third ownship position;

the third ownship position having a third value of the accuracy metric, wherein the third value of the accuracy metric is associated with a higher accuracy than the first value of the accuracy metric or the second value of the accuracy metric.

2. The system of claim 1, wherein the accuracy metric comprises:
at least one of a Source Integrity Level (SIL), a Horizontal Positioning Error (HPE), a Navigation Integrity Category (NIC), a Navigation Accuracy Category for Position (NAC-P), or a Navigation Accuracy Category for Velocity (NAC-V).

3. The system of claim 2, wherein the accuracy metric further includes a containment radius.

4. The system of claim 1, wherein the processor is further configured to transmit, via the one or more antenna elements, the determined ownship position data using the one or more antenna elements, wherein the additional ownship position is transmitted as an ADS-B Out signal.

5. The system of claim 1, wherein determining the third ownship position comprises:
averaging the first ownship position and the second ownship position.

6. A method for determining position data associated with a subject vehicle, comprising:
receiving, via one or more antenna elements, one or more Global Navigation Satellite System (GNSS) signals;
receiving, via the one or more antenna elements, one or more Automatic Dependent Surveillance Broadcast (ADS-B) signals;
extracting GNSS position data from the one or more GNSS signals;
extracting ADS-B position data from the one or more ADS-B signals;
determining an ownship position corresponding to the subject vehicle based on the extracted GNSS position data and the extracted ADS-B position data by:
extracting GNSS time difference of arrival (TDOA) data from the one or more GNSS signals;
extracting ADS-B TDOA data from the one or more ADS-B signals;
and
determining an ownship position corresponding to the subject vehicle based on multilateration using the extracted GNSS TDOA data and extracted ADS-B TDOA data in a common processing step, step by:
determining a first ownship position with a first value of a selected accuracy metric corresponding to the subject vehicle based on the extracted GNSS position data;
determining a second ownship position with a second value of the selected accuracy metric corresponding to the subject vehicle;
and
determining a third ownship position with a third value of the selected accuracy metric corresponding to the subject vehicle based on the first ownship position and the second ownship position by:
assigning a first weight to the first ownship position based on the first value of the accuracy metric;
assigning a second weight to the second ownship position based on the second value of the accuracy metric;
and
calculating a weighted average of the first ownship position and the second ownship position based on the first weight and the second weight to generate the third ownship position.

7. The method of claim 6, wherein the third value of the accuracy metric is associated with a higher accuracy than the first value of the accuracy metric or the second value of the accuracy metric.

8. The method of claim 6, wherein determining the third ownship position with the third value of the selected accuracy metric corresponding to the subject vehicle based on the first ownship position and the second ownship position includes averaging the first ownship position and the second ownship position.

9. The method of claim 6, wherein the selected accuracy metric comprises:
at least one of a Source Integrity Level (SIL), a Horizontal Positioning Error (HPE), a Navigation Integrity Category (NIC), a Navigation Accuracy Category for Position (NAC-P), or a Navigation Accuracy Category for Velocity (NAC-V).

10. The method of claim 6, further comprising transmitting the determined position data as an ADS-B Out signal.

11. The method of claim 6, wherein the selected accuracy metric includes a containment radius.

* * * * *